Jan. 22, 1957  J. DOLZA ET AL  2,778,345
HYDRAULIC WINDSHIELD WIPER MOTOR
Filed March 11, 1954  2 Sheets-Sheet 1

INVENTORS
John Dolza, &
BY Earl R. Pierce
Paul Fitzpatrick
ATTORNEY

Jan. 22, 1957  J. DOLZA ET AL  2,778,345
HYDRAULIC WINDSHIELD WIPER MOTOR
Filed March 11, 1954  2 Sheets-Sheet 2

INVENTORS
John Dolza, &
BY Earl R. Pierce
Paul Fitzpatrick
ATTORNEY

United States Patent Office 2,778,345
Patented Jan. 22, 1957

2,778,345

HYDRAULIC WINDSHIELD WIPER MOTOR

John Dolza, Davisburg, and Earl R. Pierce, Birmingham, Mich., assignors to General Motors Corporation, Detroit, Mich., a corporation of Delaware Application March 11, 1954, Serial No. 415,486

12 Claims. (Cl. 121—164)

This invention relates to a servo-mechanism and more particularly to a fluid operated windshield wiper motor.

An object of the invention is to provide a windshield wiper with a fluid operated unitary servo-motor of simple and unique construction.

Another object of the invention is to provide the servo-motor with a control that will enable the rate of windshield wiper oscillation to be varied in accordance with the operator's desire and that will enable the windshield wipers to be parked outside of their operating range of movement.

A further object of the invention is to provide a servo-motor that may be mounted directly on the engine of a vehicle without the transmission of a visual indication of engine vibration to the operator when the wipers are parked.

Further objects and advantages of the present invention will be apparent from the following description, reference being had to the accompanying drawings, wherein a preferred form of the present invention is clearly shown.

Figure 1:
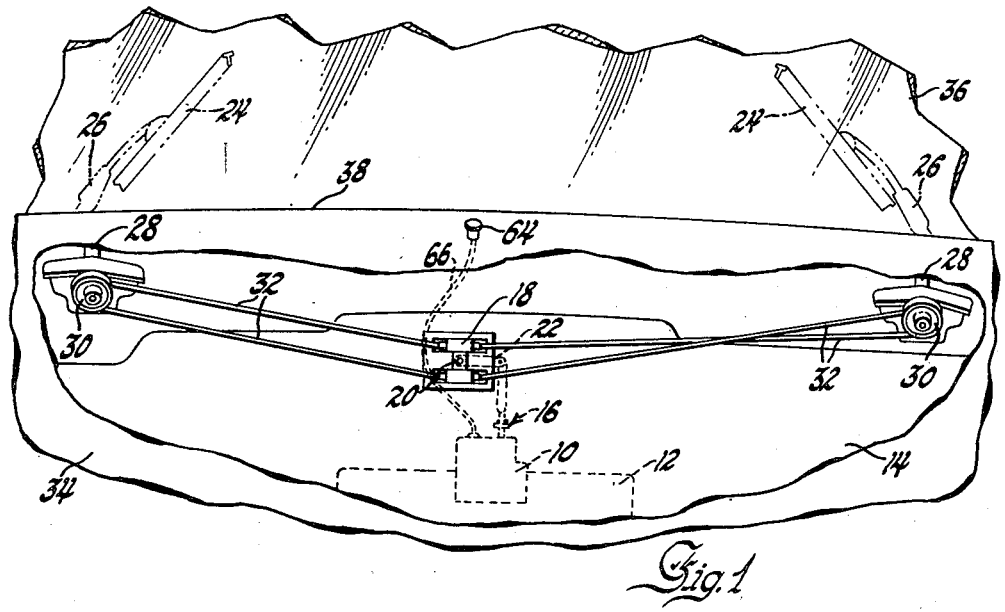
Fig. 1 is a partial plan view of the forward interior of an automobile, partially broken away to illustrate the windshield wiping mechanism.

Referring now to the drawings and more particularly to Fig. 1, the wiper motor 10 may be secured to the rearward side of the engine 12 as shown, or to the engine side of the passenger compartment firewall 14. The wiper motor includes a reciprocating piston 16 that oscillates a conventional drive crank 18 mounted on the passenger side of the firewall by a shaft 20 and pivotally connected to the piston by a lever 22 on the engine side of the firewall. The wiper blades 24 are mounted by the wiper arms 26 onto the drive shafts 28 which project through the cowl portion of the vehicle into the interior and terminate in the pulleys 30 for oscillation by the crank arms 18 and the cables 32. An instrument panel 34 conceals that portion of the windshield wiping mechanism that lies within the passenger compartment from the occupant's view. The wipers 24 both oscillate in a predetermined arc on the windshield 36, the inner limits of the arc being a few inches above the lower windshield molding 38 during wiper operation. The wipers are parked out of this range and against the molding 38 to prevent their interfering with the operator's vision.

Figure 2:
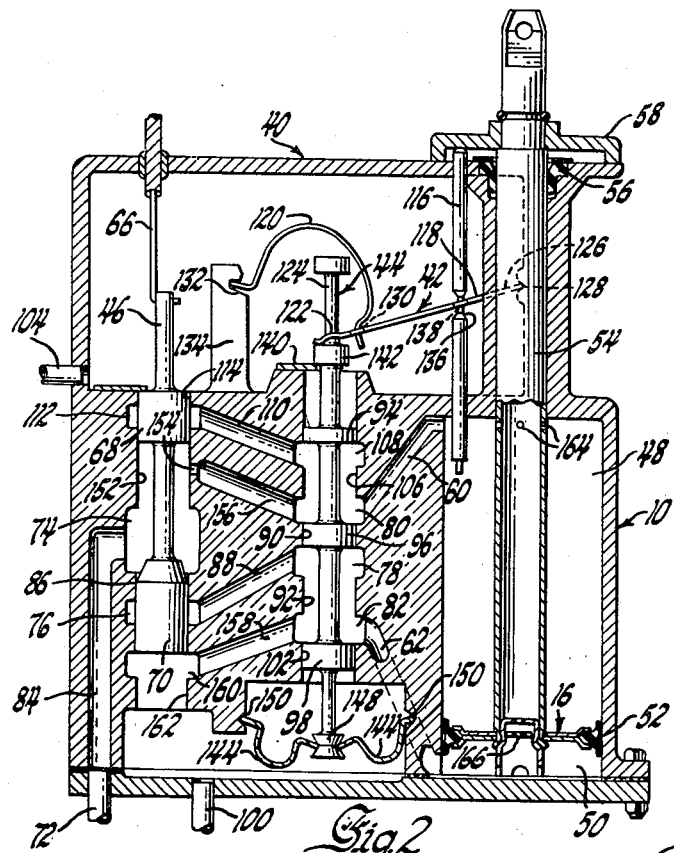
Fig. 2 is a sectional view of the wiper motor in the parked position.
Figure 3:
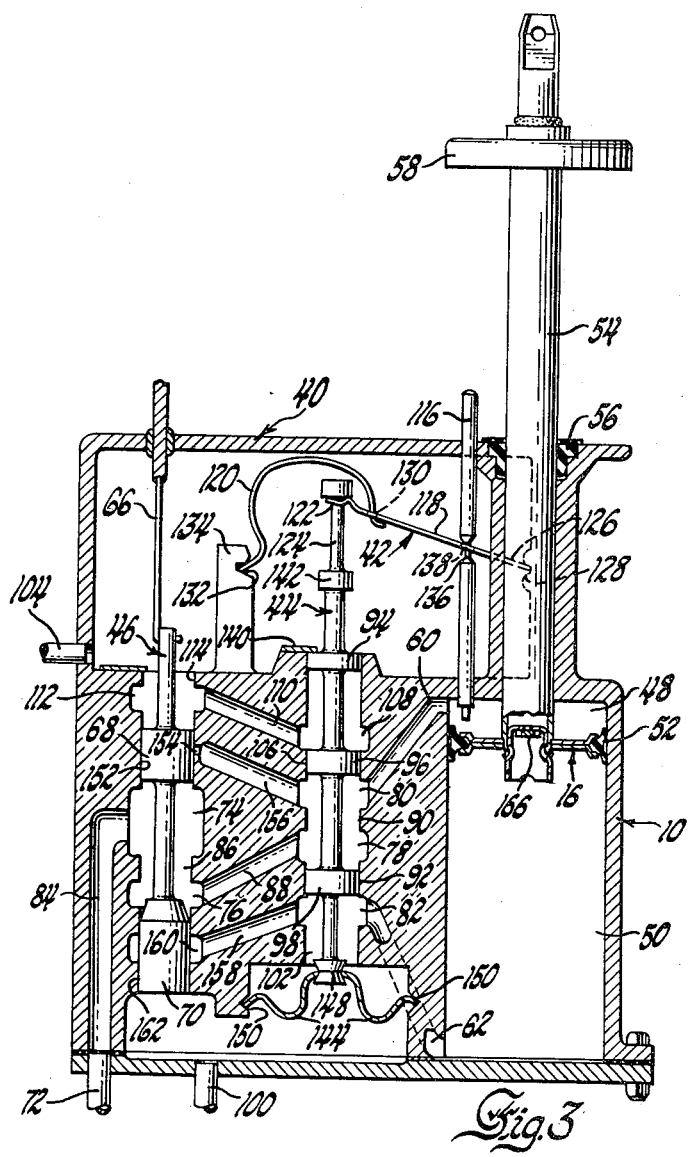
Fig. 3 is a sectional view of the wiper motor in the full speed running position.

Referring now to Figs. 2 and 3, the wiper motor 10 comprises five major elements, namely, a unitary housing 40, the piston 16, a reverser 42, a shuttle valve 44 and a control valve 46. The motor may be best understood by first referring to the running position shown in Fig. 3.

The piston 16 is motivated by alternatively supplying pressurized oil from the engine to the cylinder chambers 48 and 50 and by simultaneously venting the non-pressurized cylinder chambers to the engine crankcase. The term piston should be understood to include any suitable movable wall device. A rubber seal 52 prevents leakage across the piston 16 which transmits its movement to the wipers through a piston rod 54 that is slidably supported by a bore in the housing 40. A rubber seal 56 prevents oil leakage from the housing and an actuating cap 58 seats against the housing when the piston is in the parked position to prevent dust accumulation on the piston rod 54. Passages 60 and 62 serve to alternatively pressurize and drain the chambers 48 and 50 to operate the piston. The operating range of the piston is from the upper position shown in Fig. 3 to a lower position approximately one-eighth of an inch above the park position shown in Fig. 2; the park position is necessarily below the running range to park the wiper blades 24 flush against the molding 38.

The control valve 46 furnishes pressurized oil to the shuttle valve 44 to reciprocate the piston 16 at the desired speed and also to park the piston. The control valve 46 is balanced and is moved axially by an operator's control knob 64 and a push-pull cable 66. The control valve 46 has a parking bead 68 and a speed bead 70. A conduit 72 furnishes pressurized oil to the chambers 74 and 76 of the control valve, to the chamber 78 of the shuttle valve 44, and alternatively to the chambers 80 and 82 by way of the passages 84, 86, 88, 90 and 92 when the control valve is in the position shown in Fig. 3. The speed of motor operation may be decreased by moving the control valve 46 upward to throttle the passage 86 with the tapered portion of the speed bead 70.

The shuttle valve 44 is balanced and is provided with beads 94, 96 and 98. The valve is shuttled from the position shown in Fig. 3 to the position shown in Fig. 2 by the reverser 42 which is operated by the reciprocations of the piston. With the shuttle valve in the up position, pressure fluid is directed to the cylinder chamber 48 from the shuttle valve pressure chamber 78 by means of the passage 90, the chamber 80 and the passage 60 while the cylinder chamber 50 is vented to a drain conduit 100 by way of the passage 62, the chamber 82 and a passage 102. With the shuttle valve in the down position, pressure fluid is directed to the cylinder chamber 50 from the shuttle valve pressure chamber 78 by means of the passage 92, the chamber 82 and the passage 62, while the cylinder chamber 48 is vented to a drain conduit 104 by way of the passage 60, the chamber 80, a passage 106, a chamber 108, a passage 110, a chamber 112 and a passage 114.

The reverser 42 includes a trigger pin 116, a hammer lever 118 and a hammer spring 120. The trigger pin is slidably supported by the housing 40 for reciprocation by alternative engagement with the piston 16 and the actuating cap 58. The hammer lever 118 has a forked end 122 that is slidably supported against the necked extension 124 of the shuttle valve by pivotally abutting an end 126 in a slot 128 in the housing. One end of the hammer spring 120 passes through an aperture 130 in the hammer lever and the other end pivotally abuts in a slot 132 in a projection 134 in the housing. The trigger pin is provided with a reduced portion 136 that passes through a bore 138 in the hammer lever. As the piston approaches the end of an operating stroke, the piston or the actuating cap contacts and moves the trigger pin. The trigger pin moves the hammer lever past median position whereupon the toggle or hammer spring snaps the hammer lever against the ends of the necked down extension 124 of the shuttle valve. The blow of the hammer lever shifts the shuttle valve from an upper position determined by the engagement of a housing stop plate 140 with the shuttle valve bead 94 to a lower position determined by the engagement of the stop plate 140 with a shuttle valve bead 142. A pair of relatively light toggling or holding springs 144 are engaged by a groove 148 on the shuttle valve and a pair of slots 150 in the housing. The holding springs 144 maintain the shuttle valve in position so that a snap action is imparted thereto by the reverser 42, that is, they permit the forked end 122 of the hammer lever to slide upon the necked extension 124 of the shuttle valve without causing the shuttle valve to move until the forked end engages the ends of the necked extension. The toggling action of the reverser causes the shuttle valve to shift before the piston 46 reaches the ends of the cylinder while the wiper is in operation, thus allowing the piston an additional amount of permissible movement for the parking of the wiper.

Referring to Fig. 2, the wiper is parked by moving the control valve 46 to the parked position shown. Pressurized oil is then directed to the cylinder chamber 48 by way of the passage 84, the chamber 74, a passage 152, an orifice 154, a passage 156, the chamber 80 and the passage 60 to move the piston 16 to the parked position shown. The cylinder chamber 50 is vented to the drain 100 by way of the passage 62, the chamber 82, a passage 158, a chamber 160 and a passage 162. The shuttle valve becomes inoperative as the control valve bead 70 cuts off the flow of pressurized oil to the shuttle valve chamber 78. The piston will move towards the parked position regardless of its or the shuttle valve's position whenever the control valve is placed in the parking position. The piston rod 54 is hollow and ports 164 are so located therein as to establish communication between the cylinder chamber 48 and the interior of the rod when the piston is in the parked position thereby allowing the pressurized oil in the cylinder chamber 48 to drain down through the piston rod and into the cylinder chamber 50 (and thence to drain 100). The piston 16 is thus unloaded in the parked position in order to allow the servomotor to be directly mounted on the engine without causing the transmission of a visual indication of engine vibration to the operator. The engine has some shake relative to the automobile body but the wiper blades 24 will repose motionless in frictional engagement with the windshield because the piston is freed. Should an attempt be made to directly move the wipers from their parked position or should they creep therefrom, their return is automatically effectuated as the piston rod ports 164 leave the cylinder chamber 48 to repressurize the same. A check valve 166 is installed in the lower end of the piston rod to prevent the oil from flowing from the cylinder chamber 50 to the cylinder chamber 48 so that the cylinder chamber 50 may be pressurized to place the wiper motor in operation from the parked position.

While the preferred embodiment of the invention has been described fully in order to explain the principles of the invention, it is to be understood that modifications of structure may be made by the exercise of skill in the art within the scope of the invention which is not to be regarded as limited by the detailed description of the preferred embodiment.

We claim:

1. A wiper motor comprising a housing, a piston reciprocable therein, means actuated by the piston at either end of its running stroke for subjecting opposite sides of the piston to differential pressures in alternate directions to reciprocate the same, means for controlling the speed of piston operation and for parking the piston outside of the running range of movement, and means for equalizing the pressures on opposite sides of the piston while the piston is in the parked position.

2. A wiper motor comprising a housing, a piston reciprocable therein, valve means for subjecting opposite sides of the piston to differential pressures in alternate directions to reciprocate the same, reverser means for snapping the valve means to first and second positions actuated by the piston at either end of its running stroke, control means for directing the flow of fluid to the valve means to control the speed of piston operation and to park the piston outside of the running range of movement, and means for equalizing the pressures on opposite sides of the piston when the piston is in the parked position.

3. A wiper motor comprising a housing, a piston reciprocable therein, a shuttle valve reciprocable in the housing between first and second positions for subjecting opposite sides of the piston to differential pressures in alternate directions to reciprocate the same, a toggle-action holding spring for retaining the shuttle valve in the first and second positions, and a toggle-action reverser including a second toggle-action spring for snapping the shuttle valve to the first and second positions.

4. A wiper motor comprising a housing, a piston reciprocable therein, a shuttle valve reciprocable in the housing between first and second positions for subjecting opposite sides of the piston to differential pressures in alternate directions to reciprocate the same, and a toggle-action reverser for snapping the shuttle valve to the first and second positions actuated by the piston at either end of its running stroke, said shuttle valve having a pair of spaced abutments, said toggle-action reverser comprising a lever having a portion slidably disposed between said abutments and an over-center spring operatively connected with said lever.

5. A wiper motor comprising a housing, a piston reciprocable therein, a shuttle valve reciprocable in the housing between first and second positions for subjecting opposite sides of the piston to differential pressures in alternate directions to reciprocate the same, a toggle-action reverser for snapping the shuttle valve to the first and second positions actuated by the piston at either end of its running stroke, and a control valve for directing the flow of fluid to the shuttle valve to control the speed of piston operation, said toggle-action reverser comprising a reciprocable trigger pin slidably supported in said housing and engageable by said piston at each end of its running stroke, a lever supported for pivotal movement within said housing and having operative engagement with said pin and said shuttle valve and an over-center spring operatively connected with said lever for effecting snap action movement thereof whereby said lever will effect snap action movement of said shuttle valve when said piston reaches either end of its running stroke.

6. A wiper motor comprising a housing, a piston reciprocable therein, a shuttle valve reciprocable in the housing for subjecting opposite sides of the piston to differential pressures in alternate directions to reciprocate the same, a reverser for reciprocating the shuttle valve actuated by the piston at either end of its running stroke, a control valve for directing the flow of fluid to the shuttle valve to control the speed of piston operation and to park the piston outside of its running range of movement, and means for equalizing the pressures on opposite sides of the piston when the piston is in the parked position.

7. A wiper motor comprising a housing, a piston reciprocable therein, a shuttle valve reciprocable in the housing between first and second positions for subjecting opposite sides of the piston to differential pressures in alternate directions to reciprocate the same, a toggle-action holding spring for retaining the shuttle valve in the first and second positions, a toggle-action reverser for snapping the shuttle valve to the first and second positions including a trigger pin reciprocal in the housing and actuated by the piston at either end of its running stroke and a spring-biased hammer actuated by the trigger pin for operative engagement with the shuttle valve, a control valve for directing the flow of fluid to the shuttle valve to control the speed of piston operation and to park the piston outside of its running range of movement, and means for equalizing the pressures on the opposite sides of the piston while in the parked position.

8. A wiper motor comprising a housing, a piston reciprocable therein, means actuated by the piston at either end of its running stroke for subjecting opposite sides of the piston to differential pressures in alternate directions to reciprocate the same, means for controlling the speed of piston operation, means for parking the piston outside of its running range of movement, and means for equalizing the pressures on the opposite sides of the piston while in the parked position.

9. A wiper motor comprising a housing, a piston reciprocable therein, a shuttle valve reciprocable in the housing between first and second positions for subjecting opposite sides of the piston to differential pressures in alternate directions to reciprocate the same, a toggle-action holding spring for retaining the shuttle valve in the first and second positions, a toggle-action reverser for snapping the shuttle valve to the first and second positions actuated by the piston at either end of its running stroke, a control valve for directing the flow of fluid to the shuttle valve to control the speed of piston operation and to park the piston outside of the running range of movement, and means for equalizing the pressures on the opposite sides of the piston while in the parked position.

10. A wiper motor comprising a housing, a piston reciprocable therein, a shuttle valve reciprocable in the housing between first and second positions for subjecting opposite sides of the piston to differential pressures in alternate directions to reciprocate the same, a toggle-action holding spring for retaining the shuttle valve in the first and second positions, a toggle-action reverser for snapping the shuttle valve to the first and second positions including a trigger pin reciprocal in the housing and actuated by the piston at either end of its running stroke and a spring-biased hammer actuated by the trigger pin for operative engagement with the shuttle valve, a control valve for directing the flow of fluid to the shuttle valve to control the speed of piston operation and to park the piston outside of the running range of movement, and means including a check valve for equalizing the pressures on the opposite sides of the piston while in the parked position.

11. A wiper motor comprising a housing, a reciprocable piston disposed in said housing capable of fluid pressure actuation in either direction, reversing valve means operatively connected to and actuated by said piston adjacent each end of its normal running stroke for maintaining said piston in a state of continuous reciprocation, means for moving said piston beyond one end of its normal running stroke to a parked position, and means for equalizing the pressures on opposite sides of the piston when it is in the parked position.

12. The motor set forth in claim 11 wherein said piston is disposed in a cylinder and includes a hollow rod, said piston dividing said cylinder into two chambers, and wherein said pressure equalizing means includes at least one port in said hollow piston rod which is exposed to one cylinder chamber when the piston is moved to the parked position and a check valve for interconnecting said one cylinder chamber with the other motor chamber through said hollow rod.

References Cited in the file of this patent

UNITED STATES PATENTS

| | | |
|---|---|---|
| 413,631 | Prosser | Oct. 22, 1889 |
| 1,674,056 | Oishei et al. | June 19, 1928 |
| 2,450,564 | Sacchini | Oct. 5, 1948 |
| 2,602,430 | Bell | July 8, 1952 |
| 2,621,634 | Carey | Dec. 16, 1952 |